United States Patent
Gomez et al.

(10) Patent No.: US 9,478,230 B2
(45) Date of Patent: Oct. 25, 2016

(54) SPEECH PROCESSING APPARATUS, METHOD, AND PROGRAM OF REDUCING REVERBERATION OF SPEECH SIGNALS

(71) Applicant: HONDA MOTOR CO., LTD., Tokyo (JP)

(72) Inventors: Randy Gomez, Wako (JP); Kazuhiro Nakadai, Wako (JP); Keisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 14/495,012

(22) Filed: Sep. 24, 2014

(65) Prior Publication Data

US 2015/0088497 A1    Mar. 26, 2015

(30) Foreign Application Priority Data

Sep. 26, 2013    (JP) ................................ 2013-200391

(51) Int. Cl.
     *G10L 21/0208*    (2013.01)
     *G10L 15/20*    (2006.01)
     *G10L 21/0216*    (2013.01)

(52) U.S. Cl.
     CPC ............ *G10L 21/0208* (2013.01); *G10L 15/20* (2013.01); *G10L 2021/02082* (2013.01); *G10L 2021/02166* (2013.01)

(58) Field of Classification Search
     CPC ................. G10L 2021/02166; G10L 21/0208
     USPC ......................................................... 704/226
     See application file for complete search history.

(56) References Cited

U.S. PATENT DOCUMENTS

| | | | | |
|---|---|---|---|---|
| 8,645,130 | B2 * | 2/2014 | Watanabe | ...................... 704/231 |
| 8,867,754 | B2 * | 10/2014 | Nakajima | .............. H04R 1/406 381/58 |
| 9,093,079 | B2 * | 7/2015 | Kleffner | .............. G10L 21/0272 |
| 9,208,782 | B2 * | 12/2015 | Nakadai | .................. G10L 15/20 |
| 2008/0199024 | A1 | 8/2008 | Nakadai et al. | |

FOREIGN PATENT DOCUMENTS

| | | |
|---|---|---|
| JP | 4396449 B | 1/2010 |
| JP | 2010-054728 A | 3/2010 |
| JP | 2010-206392 A | 9/2010 |
| JP | 2012-034312 A | 2/2012 |
| JP | 2012-039276 A | 2/2012 |
| JP | 2012-109643 A | 6/2012 |

OTHER PUBLICATIONS

Japanese Office Action Notice of Reasons for Rejection application No. 2013-200391 mailing date Aug. 11, 2015.

* cited by examiner

*Primary Examiner* — Susan McFadden
(74) *Attorney, Agent, or Firm* — Squire Patton Boggs (US) LLP

(57) ABSTRACT

A speech processing apparatus that collects sound signals. With each of the collected sound signals, the apparatus may estimate a direction of a sound source, and select an extension filter that is applied to each sound signal. The extension filter may correspond to the estimated sound source of each of the sound signals. In addition, each of the sound signals may be corrected using the extension filter, and a reverberation reduction of the corrected sound signals and the collected sound signals may be performed.

8 Claims, 12 Drawing Sheets

FIG.10

|  | FIRST POSITION | SECOND POSITION | THIRD POSITION |
|---|---|---|---|
| FIRST SETTING ROOM | 100% | 100% | 100% |
| SECOND SETTING ROOM | 98% | 99% | 98% |
| THIRD SETTING ROOM | 94% | 95% | 95% |
| FOURTH SETTING ROOM | 89% | 88% | 90% |

SPEECH PROCESSING APPARATUS, METHOD, AND PROGRAM OF REDUCING REVERBERATION OF SPEECH SIGNALS

CROSS REFERENCE TO RELATED APPLICATIONS

Priority is claimed on Japanese Patent Application No. 2013-200391, filed on Sep. 26, 2013, the content of which is incorporated herein by reference.

BACKGROUND OF THE INVENTION

1. Field of the Invention

The present invention relates to a speech processing apparatus, a speech processing method, and a speech processing program.

2. Description of Related Art

A sound emitted in a room is repeatedly reflected by walls or installed objects to generate reverberations. When reverberations are added, the frequency characteristics are changed from an original speech and thus the speech recognition rate in a speech recognition apparatus performing speech recognition may be lowered. In the speech recognition apparatus, since a previously-uttered speech is added to a currently-uttered speech and thus an articulation rate may decrease. Therefore, reverberation reducing techniques of reducing reverberation components from a speech recorded under reverberant environments have been developed.

For example, Japanese Patent No. 4396449 (Patent Document 1) describes a reverberation removing method of acquiring a transfer function of a reverberation space using an impulse response of a feedback path, which is adaptively identified by an inverse filter processing unit, and reconstructing a sound source signal by dividing a reverberation speech signal by the magnitude of the transfer function. In the reverberation removing method described in Patent Document 1, the impulse response indicating the reverberation characteristic is estimated. Here, since the reverberation time ranges from 0.2 seconds to 2.0 seconds which is relatively long, the computational load excessively increases and a processing delay becomes marked. Accordingly, application thereof to speech recognition has not been widely spread.

H-G. Hirsch, Harald Finster, A New Approach for the Adaptation of HMMs to Reverberation and Background Noise, Speech Communication, Elsevier, 2008, 244-263 (Non-patent Document 5) describes a method of preparing a plurality of acoustic models obtained under reverberation environments having different reverberation times in advance and searching for an acoustic model having the highest likelihood in an environment in which a speech is recorded. The reverberation time is a time until reverberation intensity relative to a maximum value is attenuated to a predetermined intensity. In the method described in Non-patent Document 5, speech recognition is performed using the searched acoustic model.

SUMMARY OF THE INVENTION

However, in the technique described in Non-patent Document 5, a case is not considered in which the direction of a speaker is changed with respect to the speed recognition apparatus. Accordingly, when the direction of a speaker is changed, there is a problem in that the reverberation reduction performance decreases and thus the speech recognition accuracy decreases.

The invention is made in consideration of the above-mentioned circumstances and an object thereof is to provide a speech processing apparatus, a speech processing method, and a speech processing program which can realize reverberation reduction for improving speech recognition accuracy even when the direction of a sound source is changed.

(1) In order to achieve the above-mentioned object, according to an aspect of the present invention, there is provided a speech processing apparatus including: a sound collecting unit configured to collect sound signals; a sound source direction estimating unit configured to estimate a direction of a sound source of each sound signal collected by the sound collecting unit; a reverberation reducing filter calculating unit configured to calculate a reverberation reducing filter to be applied to the sound signals collected by the sound collecting unit; and a reduction processing unit configured to apply the reverberation reducing filter calculated by the reverberation reducing filter calculating unit to the sound signals, wherein the reverberation reducing filter calculating unit calculates the reverberation reducing filter to be applied based on the directions of the sound sources estimated by the sound source direction estimating unit.

(2) As another aspect of the invention, in the speech processing apparatus according to (1), the reverberation reducing filter calculating unit may calculate the reverberation reducing filter using an extension filter which is generated using a late reflection component of the sound signal and a response of the late reflection component of the direction of each of the sound sources.

(3) As another aspect of the invention, in the speech processing apparatus according to (1) or (2), the sound source direction estimating unit may estimate the direction of the sound source using a feature vector of the single sound signal collected by the sound collecting unit and a probability model of the direction of each of the sound sources.

(4) As another aspect of the invention, the speech processing apparatus according to any one of (1) to (3) may further include a sound source separating unit configured to separate a full reverberant signal and a late reflection component from the sound signals collected by the sound collecting unit, and the reverberation reducing filter calculating unit may calculate the reverberation reducing filter using an extension filter which is generated using the late reflection component separated by the sound source separating unit and a response of the late reflection component of the direction of each of the sound sources.

(5) As another aspect of the invention, in the speech processing apparatus according to (4), the reduction processing unit may reduce the late reflection component from the full reverberant signal separated by the sound source separating unit by applying the reverberation reducing filter calculated by the reverberation reducing filter calculating unit to the full reverberant signal.

(6) As another aspect of the invention, the speech processing apparatus according to (4) or (5) may further include: a first sound signal processing unit configured to calculate a first feature vector of the sound signals collected by the sound collecting unit based on a first room transfer function; and a second sound signal processing unit configured to calculate a second feature vector of the sound signals collected by the sound collecting unit based on a second room transfer function, the sound source separating unit may include a first sound source separating unit configured to separate the full reverberant signal based on the first feature vector calculated by the first sound signal processing unit and a second sound source separating unit configured to separate the late reflection component based on the second feature vector calculated by the second sound signal processing unit, and the reduction processing unit may reduce the late reflection component separated by the second sound source separating unit from the full reverberant signal separated by the first sound source separating unit by applying the reverberation reducing filter calculated by the reverberation reducing filter calculating unit to the full reverberant signal.

(7) As another aspect of the invention, in the speech processing apparatus according to any one of (1) to (6), the sound source direction estimating unit may estimate the directions of the sound sources based on at least one of an image captured by an imaging unit and detection results of azimuth sensors attached to the vicinities of the sound sources.

(8) According to still another aspect of the invention, there is provided a speech processing method including: a sound collecting step of collecting sound signals; a sound source direction estimating step of estimating a direction of a sound source of each sound signal collected in the sound collecting step; a reverberation reducing filter calculating step of calculating a reverberation reducing filter to be applied to the sound signals collected in the sound collecting step based on the directions of the sound sources estimated in the sound source direction estimating step; and a reduction step of applying the reverberation reducing filter calculated in the reverberation reducing filter calculating step to the sound signals.

(9) According to still another aspect of the invention, there is provided a non-transitory computer-readable recording medium having recorded thereon a speech processing program causing a computer of a speech processing apparatus to perform: a sound collecting procedure of collecting sound signals; a sound source direction estimating procedure of estimating a direction of a sound source of each sound signal collected in the sound collecting procedure; a reverberation reducing filter calculating procedure of calculating a reverberation reducing filter to be applied to the sound signals collected in the sound collecting procedure based on the directions of the sound sources estimated in the sound source direction estimating procedure; and a reduction procedure of applying the reverberation reducing filter calculated in the reverberation reducing filter calculating procedure to the sound signals.

According to the configurations of (1), (8), or (9), it is possible to reduce reverberations by applying the reverberation reducing filter calculated depending on the directions of the sound sources emitting the sound signals to the sound signals. Accordingly, it is possible to achieve the reduction of reverberation to improve speech recognition accuracy even when the direction of a sound source is changed.

According to the configuration of (2), since the reverberation reducing filter is calculated using the extension filter, it is possible to perform the reverberation reduction with a small computational load.

According to the configuration of (3), since the directions of the sound sources can be estimated using a single sound signal collected by the sound collecting unit, it is possible to estimate the directions of the sound sources with a small computational load.

According to the configuration of (4), since the directions of the sound sources can be estimated using a plurality of sound signals collected by the sound collecting unit and the reverberation reduction can be performed by applying the reverberation reducing filter calculated depending on the estimated directions of the sound sources to the sound signals, it is possible to achieve the reverberation reduction to improve speech recognition accuracy.

According to the configuration of (5), since the late reflection component can be reduced using the reverberation reducing filter, it is possible to perform the reverberation reduction with a small computational load.

According to the configuration of (6), since the late reflection component separated by the second sound source separating unit can be reduced from the full reverberant signal separated by the first sound source separating unit, it is possible to perform the reverberation reduction with a small computational load.

According to the configuration of (7), since the directions of the sound sources can be estimated depending on the captured image or the detection results of the azimuth sensors, it is possible to estimate the direction of a sound source with a small computational load.

BRIEF DESCRIPTION OF THE DRAWINGS

FIG. 10 is a diagram showing the effectiveness of estimation of a direction of a speaker.

DETAILED DESCRIPTION OF THE INVENTION

First, the invention will be described in brief.

A speech processing apparatus according to the invention separates a collected sound signal into a full reverberant signal and a late reflection signal. Then, the speech processing apparatus according to the invention estimates the direction of a speaker (sound source) with respect to the apparatus based on a late reflection signal and calculates a reverberation reducing filter to be applied to the sound signal based on the estimated direction of a sound source. Then, the speech processing apparatus according to the invention corrects the separated late reflection signal using the reverberation reducing filter. Then, the speech processing apparatus according to the invention performs a reduction process on the full reverberant signal based on the corrected late reflection signal. As a result, the speech processing apparatus according to the invention can achieve a reverberation reduction to improve speech recognition accuracy even when the direction of a sound source is changed.

The sound source may be a speaker having directivity or the like.

First Embodiment

Hereinafter, an embodiment of the invention will be described with reference to the accompanying drawings.

Figure 1:
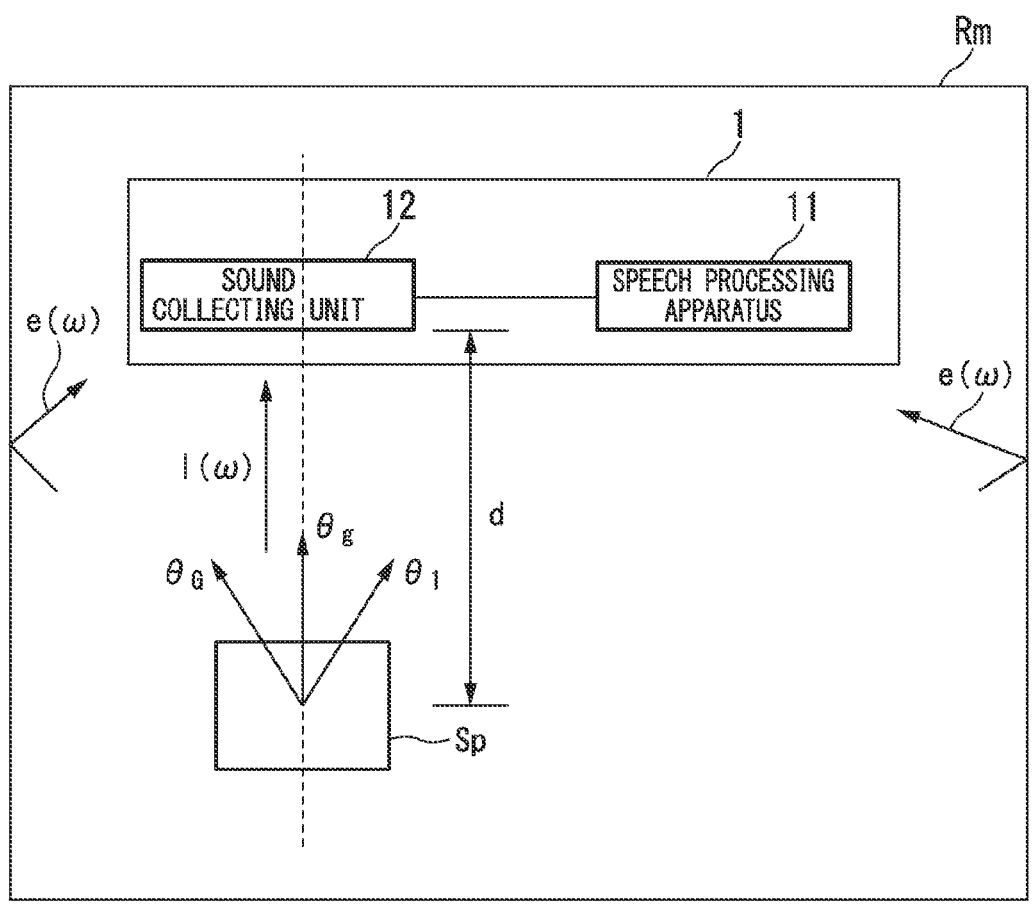
FIG. 1 is a plan view showing an arrangement example of a speech processing system according to a first embodiment of the invention.

FIG. 1 is a plan view showing an arrangement example of a speech processing system 1 according to a first embodiment of the invention. As shown in FIG. 1, the speech processing system 1 includes a speech processing apparatus 11 and a sound collecting unit 12.

In this arrangement example, a speaker Sp is located at a position separated by a distance d from the center of the sound collecting unit 12 in a room Rm as a reverberation environment. The direction (azimuth) of the speaker Sp (sound source) with respect to the sound collecting unit 12 is defined, for example, $\theta_1, \ldots, \theta_g, \ldots, \theta_G$ in a counterclockwise direction. The room Rm has an inner wall that reflects arriving sound waves. The sound collecting unit 12 collects a speech $l(\omega)$ directly arriving from the speaker Sp as a sound source and a speech $e(\omega)$ reflected by the inner wall. Here, $\omega$ represents a frequency.

The direction of the speaker Sp (sound source) is not limited to an azimuth on the horizontal plane but includes an azimuth in the vertical direction. The azimuth in the vertical direction includes, for example, the ceiling side (upper side), the bottom side (lower side), and the like of the room Rm.

The speech directly arriving from the sound source and the reflected speech are referred to as a direct sound and a reflection, respectively. A section in which the elapsed time after the direct sound is uttered is shorter than a predetermined time (for example, equal to or less than about 30 ms), the number of reflection times is relatively small, and reflection patterns are distinguished from each other in the reflection is referred to as an early reflection. A section in which the elapsed time is longer than that of the early reflection, the number of reflection times is relatively larger, and reflection patterns are not distinguished from each other in the reflection is referred to as a late reflection, a late reverberation, or simply a reverberation. In general, the time used to distinguish the early reflection and the late reflection varies depending on the size of the room Rm, but for example, a frame length as a process unit in speech recognition corresponds to the time. This is because the direct sound processed in a previous frame and the late reflection subsequent to the early reflection have an influence on the processing of a current frame.

In FIG. 1, when the speaker Sp faces the front of the sound collecting unit 12 ($\theta_g$), a speech signal uttered by the speaker Sp arrives at the sound collecting unit 12 as a speech $l(\omega)$ of a direct sound. On the other hand, when the speaker Sp faces the left of the sound collecting unit 12, a speech $e(\omega)$ obtained by reflecting the speech signal uttered by the speaker Sp from the left inner wall arrives at the sound collecting unit 12.

When a reverberation is added, the frequency characteristic is changed from the original speech. Accordingly, in a speech recognition apparatus that recognizes a speech, the speech recognition rate may decrease. In the speech recognition apparatus, since a previously-uttered speech overlaps with a currently-uttered speech, articulation rate may decrease. Accordingly, in this embodiment, it is possible to improve the speech recognition rate by reducing the late reflection signal.

In general, the closer a sound source becomes to the sound collecting unit 12 (the smaller the distance d becomes), the more the direct sound from the sound source becomes and the smaller the ratio of reverberations becomes. In the below description, a speech not including any reverberation component or including a reverberation component small enough to ignore out of speeches collected by the sound collecting unit 12 is referred to as a clean speech.

The sound collecting unit 12 collects sound signals of one or multiple (N, where N is an integer greater than 0) channels and transmits the collected sound signals of N channels to the speech processing apparatus 11. N microphones are arranged at different positions in the sound collecting unit 12. The sound collecting unit 12 includes, for example, microphones that receive sound waves of a specific frequency band (for example, 200 Hz to 4 kHz). The sound collecting unit 12 may transmit the collected sound signals of N channels in a wireless manner or a wired manner. When N is greater than 1, the sound signals only have to be synchronized with each other between the channels at the time of transmission. The sound collecting unit 12 may be fixed or may be installed in a moving object such as a vehicle, an aircraft, or a robot so as to be movable.

The speech processing apparatus 11 stores room transfer functions (RTF) $A(\omega)$ depending on the direction of the speaker Sp. The speech processing apparatus 11 separates the collected speeches into a full reverberant signal and a late reflection signal based on the stored room transfer functions. The speech processing apparatus 11 estimates the direction of the speaker Sp based on the separated late reflection signal. The speech processing apparatus 11 calculates characteristics of a noise reducing filter based on the estimated direction of the speaker Sp and the separated late reflection signal. The speech processing apparatus 11 performs a reverberation reducing process of reducing the reverberation of the separated full reverberant signal based on the calculated characteristics of the noise reducing filter. The speech processing apparatus 11 performs a speech recognition process on the speech signals subjected to the reverberation reducing process.

The configuration of the speech processing apparatus 11 according to this embodiment will be described below.

Figure 2:
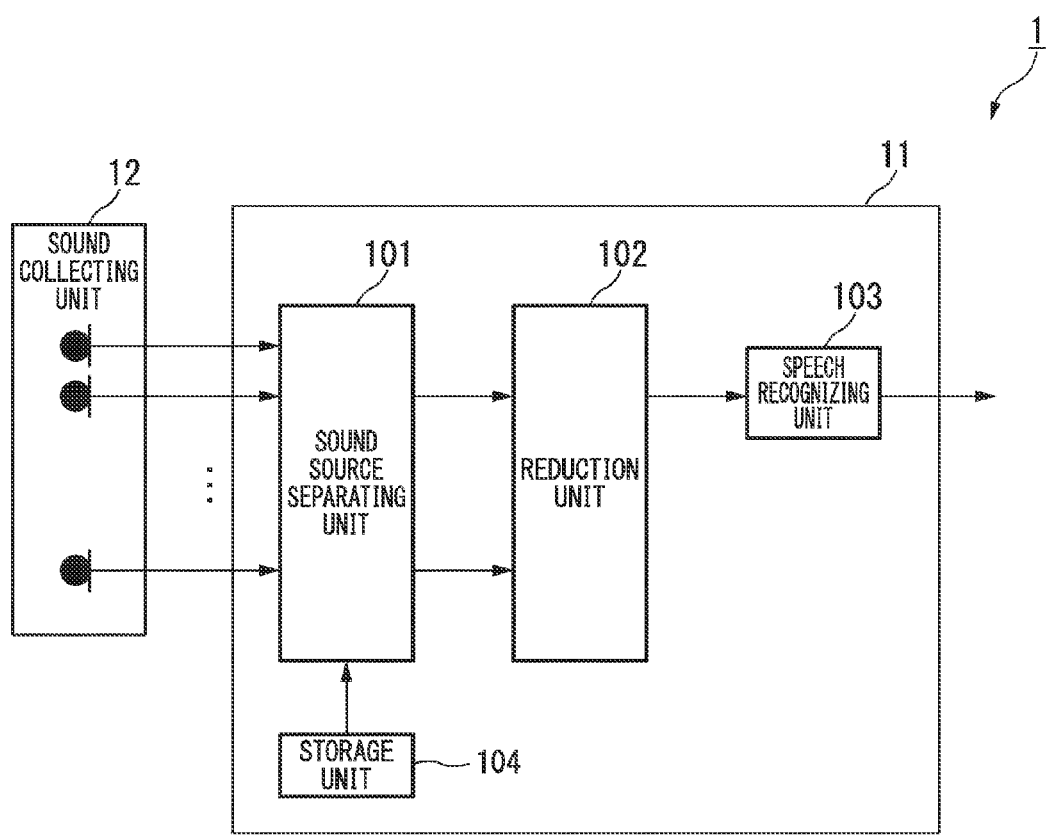
FIG. 2 is a block diagram showing a configuration of a speech processing apparatus according to the first embodiment.

FIG. 2 is a block diagram showing the configuration of the speech processing apparatus 11 according to this embodiment. As shown in FIG. 2, the speech processing apparatus 11 includes a sound source separating unit 101, a reduction unit 102, a speech recognizing unit 103, and a storage unit 104.

The storage unit 104 stores a room transfer function (first room transfer function) $A(\omega)$ and a room transfer function (second room transfer function) $A^L(\omega)$. Here, the superscript L denotes a signal or information on late reflection.

The sound source separating unit 101 acquires the sound signals of N channels transmitted from the sound collecting unit 12 and separates the acquired sound signals of N channels into a full reverberant signal s(ω) and a late reflection signal (late reflection component) $s^L(\omega)$ based on the room transfer function A(ω) stored in the storage unit 104. The sound source separating unit 101 outputs the separated full reverberant signal s(ω) and late reflection signal $s^L(\omega)$ to the reduction unit 102. The configuration of the sound source separating unit 101 will be described later.

The reduction unit 102 estimates the direction of the speaker Sp based on the late reflection signal $s^L(\omega)$ input from the sound source separating unit 101. The reduction unit 102 calculates characteristics of the noise reducing filter based on the estimated direction of the speaker Sp and the input late reflection signal $s^L(\omega)$. The reduction unit 102 performs a reverberation reducing process of reducing the reverberation of the input full reverberant signal s(ω) based on the calculated characteristics of the noise reducing filter. The reduction unit 102 outputs an estimated value (hereinafter, referred to as a sound signal subjected to reverberation reduction) $e_{\hat{\theta}}(\omega)$ of the sound signal subjected to the reverberation reducing process to a speech recognizing unit 103. Here, $\hat{\theta}$ represents the angle of the estimated direction of the speaker Sp.

The speech recognizing unit 103 recognizes speech details (for example, a text indicating a word or a sentence) by performing a speech recognizing process on the reverberation-reduced sound signal $e_{\hat{\theta}}(\omega)$ input from the reduction unit 102, and outputs the recognition data indicating the recognized speech details to the outside. The speech recognizing unit 103 includes, for example, a hidden Markov model (HMM) which is an acoustic model and a word dictionary.

Here, the speech recognizing unit 103 calculates a sound feature quantity of the reverberation-reduced sound signal for every predetermined time interval (for example, 10 ms). The sound feature quantity is, for example, a feature vector which is a set of 34-dimensional Mel-frequency cepstrum coefficients (MFCC), a static Mel-scale log spectrum (static MSLS), a delta MSLS, and single delta power, a set of a static Mel-scale log spectrum, a delta MSLS, and single delta power, or the like. The speech recognizing unit 103 determines phonemes from the calculated sound feature quantity using an acoustic model, and recognizes a word from a phoneme sequence including the determined phonemes using a word dictionary.

Figure 3:
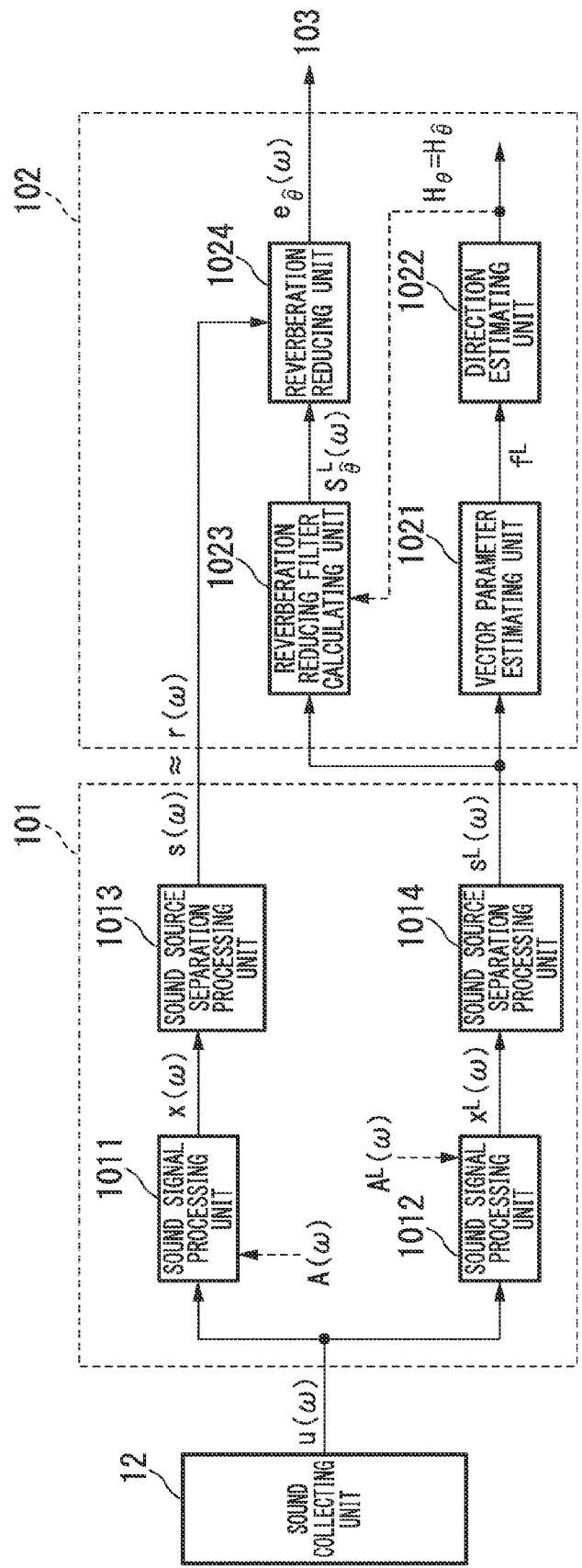
FIG. 3 is a block diagram showing configurations of a sound source separating unit and a reduction unit according to the first embodiment.

The sound source separating unit 101 and the reduction unit 102 will be described below with reference to FIG. 3. FIG. 3 is a block diagram showing the configurations of the sound source separating unit 101 and the reduction unit 102 according to this embodiment.

First, the sound source separating unit 101 will be described. As shown in FIG. 3, the sound source separating unit 101 includes a sound signal processing unit 1011, a sound signal processing unit 1012, a sound source separation processing unit 1013, and a sound source separation processing unit 1014.

The sound signals u(ω) collected by a plurality of microphones of the sound collecting unit 12 are input to the sound signal processing unit 1011. The sound signals u(ω) are a vector $[u_1(\omega), \ldots, u_M(\omega)]^T$ when there are K sound sources. A vector x(ω) including the signals observed by M microphones is expressed by Expression (1).

$$x(\omega)=[x_1(\omega), \ldots, x_M(\omega)]^T \quad (1)$$

When the room transfer function A(ω) stored in the storage unit 104 is K×M-dimensional set $C^{M \times K}$, the sound signal processing unit 1011 computes the vector x(ω) using Expression (2) based on Expression (1). The set C represents a set as a combination of M microphones and K sound sources. The sound signal processing unit 1011 outputs the calculated vector x(ω) to the sound source separation processing unit 1013. A(ω) is a room transfer function of early reflection, for example, acquired in advance by measurement or experiment. A(ω) may be measured every time.

$$x(\omega)=A(\omega)u(\omega) \quad (2)$$

Similarly, the sound signal processing unit 1012 computes the vector $x^L(\omega)$ using Expression (3) using the room transfer function $A^L(\omega)$ stored in the storage unit 104. The sound signal processing unit 1012 outputs the calculated vector $x^L(\omega)$ to the sound source separation processing unit 1014. $A^L(\omega)$ is a room transfer function of late reflection, for example, acquired in advance by measurement or experiment. $A^L(\omega)$ may be measured every time.

$$x^L(\omega)=A^L(\omega)u(\omega) \quad (3)$$

The sound source separation processing unit 1013 separates the vector x(ω) into sound signals of one or more sound sources by performing a sound source separating process on the vector x(ω) input from the sound signal processing unit 1011. The sound source separation processing unit 1013 outputs the separated full reverberant signal s(ω) to the reduction unit 102. The full reverberant signal s(ω) is almost equal to a reverberation signal r(ω). The reverberation signal r(ω) is expressed by Expression (4) based on the early reflection signal e(ω) and the late reflection signal l(ω).

$$r(\omega)=e(\omega)+l(\omega) \quad (4)$$

The sound source separation processing unit 1013 calculates the full reverberant signal s(ω) using Expression (5) based on, for example, a geometric-constrained high order decorrelation-based source separation (GHDSS) method as the sound source separating process.

$$s(\omega)=\text{GHDSS}[x(\omega)] \quad (5)$$

The sound source separation processing unit 1014 separates the vector $x^L(\omega)$ into sound signals of one or more sound sources by performing a sound source separating process on the vector $x^L(\omega)$ input from the sound signal processing unit 1012. The sound source separation processing unit 1014 outputs the separated late reflection signal $s^L(\omega)$ to the reduction unit 102. The sound source separation processing unit 1014 calculates the late reflection signal $s^L(\omega)$ using Expression (6) and, for example, using the GHDSS method as the sound source separating process.

$$s^L(\omega)=\text{GHDSS}[x^L(\omega)] \quad (6)$$

The sound source separation processing unit 1013 and the sound source separation processing unit 1014 may use, for example, an adaptive beam forming method of estimating a sound source direction and controlling directivity so as to have the highest sensitivity in a designated sound source direction instead of the GHDSS method. At the time of estimating the sound source direction, the sound source separation processing unit 1013 and the sound source separation processing unit 1014 may use a multiple signal classification (MUSIC) method.

The GHDSS method will be described below.

The GHDSS method is a method of separating collected sound signals of multiple channels into sound signals by sound sources. In this method, a separation matrix [V(ω)] (a full reverberant signal s(ω) or a late reflection signal $s^L(\omega)$) is sequentially calculated and the input speech vector [x(ω)] is multiplied by the separation matrix [V(ω)] to estimate a sound source vector [u(ω)]. The separation matrix [V(ω)] is a pseudo-inverse matrix of a transfer function matrix $[H(\omega)]$ having transfer functions from respective sound sources to the microphones of the sound collecting unit 12 as elements. The input speech vector $[x(\omega)]$ is a vector having frequency-domain coefficients of the sound signals of channels as elements. The sound source vector $[u(\omega)]$ is a vector having frequency-domain coefficients of the sound signals emitted from the respective sound sources as elements.

At the time of calculating the separation matrix $[V(\omega)]$, the sound source separation processing unit 1013 and the sound source separation processing unit 1014 calculate the sound source vector $[u(\omega)]$ so as to minimize two cost functions such as separation sharpness JSS and geometric constraint JGC.

The separation sharpness JSS is an index value indicating a degree to which one sound source is erroneously separated as a different sound source and is expressed, for example, by Expression (7).

$$J_{SS}=\|[u(\omega)Iu(\omega)]^*-\text{diag}([u(\omega)Iu(\omega)]^*)\|^2 \qquad (7)$$

In Expression (7), $\|\ldots\|^2$ represents a Frobenius norm of . . . , and * represents the conjugate transpose of a vector or a matrix. diag( . . . ) represents a diagonal matrix having diagonal elements of . . . .

The geometric constraint $JGC(\omega)$ is an index value indicating a degree of error of the sound source vector $[u(\omega)]$ and is expressed, for example, by Expression (8).

$$J_{GC}=\|\text{diag}([V(\omega)IA(\omega)]-[I])\|^2 \qquad (8)$$

In Expression (8), [I] represents a unit matrix.

The reduction unit 102 will be described below. As shown in FIG. 3, the reduction unit 102 includes a vector parameter estimating unit 1021, a direction estimating unit (sound source direction estimating unit) 1022, a reverberation reducing filter calculating unit 1023, and a reverberation reducing unit (reduction processing unit) 1024.

The late reflection signal $s^L(\omega)$ input from the sound source separation processing unit 1014 includes redundant information in the time domain. Accordingly, the vector parameter estimating unit 1021 estimates the feature vector $f^L$ of the late reflection signal $s^L(\omega)$ using Expression (9) and outputs the estimated feature vector $f^L$ to the direction estimating unit 1022.

$$f^L=F[s^L(\omega)] \qquad (9)$$

In Expression (9), F represents a feature extraction order for acquiring the feature vector $f^L$. The feature vector is, for example, 12-dimensional mel-frequency cepstrum coefficients (MFCC), or 12-dimensional delta MFCC, or one-dimensional delta energy.

The direction estimating unit 1022 estimates the estimated value $\hat{\theta}$ of the direction $\theta$ of the speaker Sp by evaluating the feature vector $f^L$ input from the vector parameter estimating unit 1021 based on the likelihood of Expression (10).

$$\hat{\theta}=\underset{\theta}{\arg\max}\ p(f^L\mid\mu_{\theta_g}) \qquad (10)$$

In Expression (10), arg max p( . . . ) is a function of giving p for maximizing . . . $\mu_{\theta_g}$ is a probability model of a set of directions $\{\theta_1, \ldots, \theta_g, \ldots, \theta_G\}$. The direction estimating unit 1022 uses $\theta_g$, of which the calculated value is a maximum, to select an extension filter $H_\theta\hat{}$ an appropriate equalizer.

In Expression (10), the probability model $\mu_{\theta_g}$ is, for example, learned in advance. In learning the probability model $\mu_{\theta_g}$, the late reflection signal $s^L(\omega)$ is expressed by Expression (11) instead of Expressions (3) and (6).

$$s^L(\omega)=A^L(\omega)u(\omega) \qquad (11)$$

The feature vector $f^L_\theta$ in the direction $\theta$ is expressed by Expression (12) using the extension filter $H_\theta$ of the equalizer which is made into a parameter.

$$f_\theta^L=F[s^L(\omega)H_\theta] \qquad (12)$$

The plurality of extension filters $H_\theta$ for each direction $\theta$ of the speaker Sp (sound source) are stored in the direction estimating unit 1022, for example, in advance by experiment or measurement.

The direction estimating unit 1022 selects the extension filter $H_\theta$ in Expression (12) from the stored extension filters $H_\theta$ and outputs the selected extension filter $H_\theta$ as the estimated value $H_\theta\hat{}$ to the reverberation reducing filter calculating unit 1023.

The probability model $\mu_{\theta_g}$ in Expression (10) is learned using Expression (13) based on the set of directions $\{\theta_1, \ldots, \theta_g, \ldots, \theta_G\}$. This process is performed off-line.

$$\hat{\mu}_\theta=\underset{\mu}{\arg\max}\ \prod_{i=1}^{I}\max_\theta\ p(f_{\theta_i};\mu_g) \qquad (13)$$

In Expression (13), $\mu$ is an unknown model parameter and $f_{\theta_i}$ is a training vector of i-th late reflection. The training vector is equalized by the extension filter $H_\theta$.

The reverberation reducing filter calculating unit 1023 corrects the late reflection signal $s^L(\omega)$ input from the sound source separation processing unit 1014 based on the equalizer characteristic corresponding to the estimated value $H_\theta\hat{}$ of the extension filter input from the direction estimating unit 1022. The reverberation reducing filter calculating unit 1023 outputs the corrected late reflection signal $s^L_\theta\hat{}(\omega)$ to the reverberation reducing unit 1024.

Theoretically, the room transfer function $A(\omega)$ is necessary for each direction $\theta$ of the speaker Sp.

This is because the reverberation characteristic of the room Rm varies whenever the direction $\theta$ of the speaker Sp varies. Particularly, it has been confirmed by experiment that the late reflection signal $s^L(\omega)$ varies with the variation in the direction $\theta$ of the speaker Sp. However, it is difficult to measure the room transfer characteristic for each direction $\theta$ of the speaker Sp in M microphones. Accordingly, in this embodiment, computation is equivalently carried out by using the late reflection signal $s^L(\omega)$ separated from multiple channels by the sound source separating unit 101. Accordingly, in this embodiment, it is possible to simplify the influence of the direction $\theta$ of the speaker Sp in the room transfer functions of multiple channels in a filtered sound signal of one channel.

That is, the reverberation reducing filter calculating unit 1023 calculates the equalized corrected late reflection signal $s^L_\theta\hat{}(\omega)$ using Expression (14).

$$s_\theta^L(\omega)=s^L(\omega)H_\theta \qquad (14)$$

In Expression (14), the late reflection signal $s^L(\omega)$ is the separated late reflection using a general room transfer function while it is equalized using the extension filter $H_\theta$.

The extension filter $H_\theta$ is, for example, a filter characteristic acquired by measuring the late reflection signal $s^L(\omega)$ depending on the actual direction $\theta$ of the speaker Sp.

The reverberation reducing filter calculating unit 1023 stores, for example, a direction model correlated with each direction θ of the speaker Sp. The direction model is, for example, a Gaussian mixture model (GMM). The GMM is a kind of acoustic model in which the output probabilities for input sound feature quantities are weighted and added with a plurality of (for example, 256) normal distributions as a basis. Accordingly, the direction model is defined by statistics such as mixture weighting coefficients, mean values, and a covariance matrix. At the time of learning the GMM for each direction θ, the statistics may be determined in advance so as to maximize the likelihood using learning speech signals to which the reverberation characteristic is added for each direction θ. An HMM may be used as the direction model or a general discriminator such as a support vector machine (SVM) may be used.

After the extension filter $H_\theta\hat{}$ is estimated by the direction estimating unit 1022, the reverberation reducing filter calculating unit 1023 corrects the separated late reflection signal $s^L(\omega)$ using Expression (14).

The full reverberant signal $s(\omega)$ from the sound source separation processing unit 1013 and the corrected late reflection signal $s^L_\theta(\omega)$ from the reverberation reducing filter calculating unit 1023 are input to the reverberation reducing unit 1024.

The reverberation reducing unit 1024 employs a reverberation model of one channel. The reverberation reducing unit 1024 calculates a frequency-domain coefficient $e\hat{}(\omega, t)$ of the early reflection signal at frame t using Expression (15).

$$|\hat{e}(\omega, t)|^2 = \begin{cases} |s(\omega, t)|^2 - H_{\hat{\theta}}(\omega)|s^L_{\hat{\theta}}(\omega, t)|^2 \\ \text{if } |s(\omega, t)|^2 - H_{\hat{\theta}}(\omega)|s^L_{\hat{\theta}}(\omega, t)|^2 > 0 \\ \beta|s(\omega, t)|^2 \text{ (OTHERWISE)} \end{cases} \quad (15)$$

In Expression (15), | . . . | is the absolute value of . . . .

In Expression (15), $|s(\omega, t)|^2$ is power of the separated reflection signal (where $|s(\omega, t)|^2$ is almost equal to $|r(\omega, t)|^2$) and $|s^L(\omega, t)|^2$ is the power of the late reflection signal $s^L(\omega)$. The reverberation reducing unit 1024 generates a reverberation-reduced sound signal $e_\theta\hat{}(\omega)$ obtained by converting the calculated frequency-domain coefficient $e(\omega, t)$ of the early reflection signal into a time-domain and outputs the generated reverberation-reduced sound signal $e_\theta\hat{}(\omega)$ to the speech recognizing unit 103.

As described above, in this embodiment, it is possible to calculate the frequency-domain coefficient $e\hat{}(\omega, t)$ of the early reflection signal as expressed by Expression (15) through the equalizing process in the reverberation reducing filter calculating unit 1023.

The speech processing in this embodiment will be described below.

Figure 4:
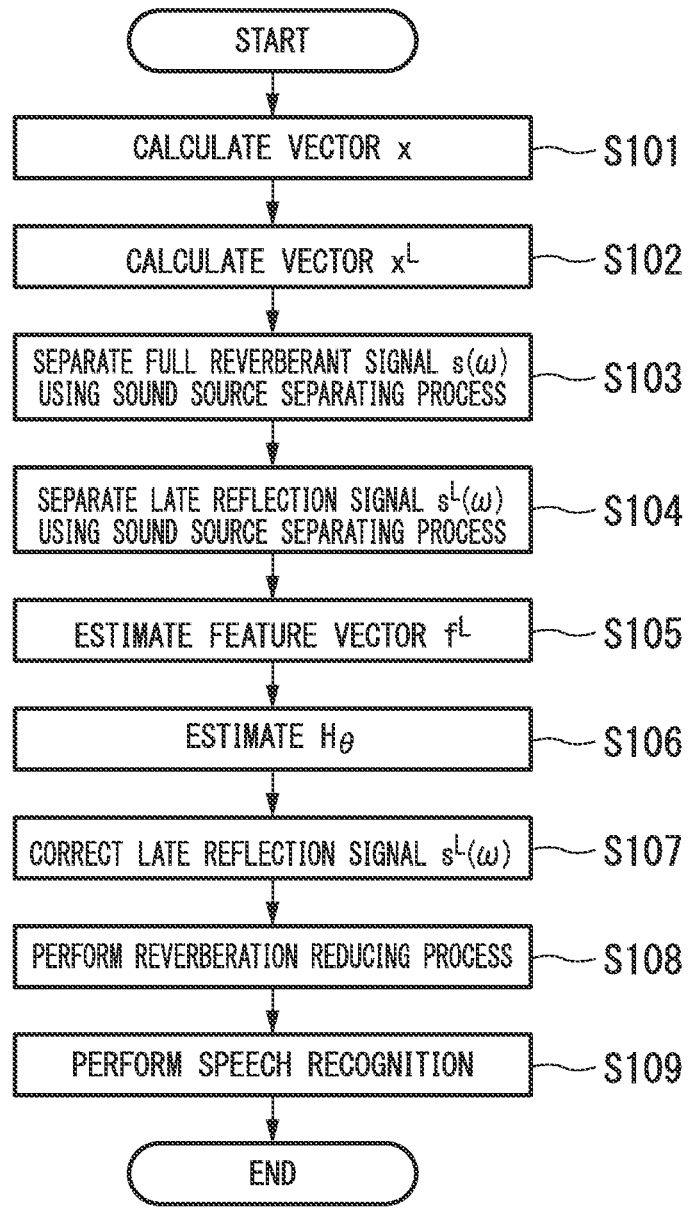
FIG. 4 is a flowchart showing speech processing in the first embodiment.

FIG. 4 is a flowchart showing the speech processing in this embodiment.

(Step S101) The sound signal processing unit 1011 calculates the vector $x(\omega)$ using Expression (2) based on the room transfer function $A(\omega)$ stored in the storage unit 104 for the sound signals of N channels input from the sound collecting unit 12. Then, the sound signal processing unit 1011 outputs the calculated vector $x(\omega)$ to the sound source separation processing unit 1013. The sound signal processing unit 1011 performs the process of step S102 after step S101 ends.

(Step S102) The sound signal processing unit 1012 calculates the vector $x^L(\omega)$ using Expression (3) based on the room transfer function $A^L(\omega)$ stored in the storage unit 104 for the sound signals of N channels input from the sound collecting unit 12. Then, the sound signal processing unit 1012 outputs the calculated vector $x^L(\omega)$ to the sound source separation processing unit 1014. The sound signal processing unit 1012 performs the process of step S103 after step S102 ends. Steps S101 and S102 may be reversed in order or may be performed at the same time.

(Step S103) The sound source separation processing unit 1013 performs the sound source separating process on the vector $x(\omega)$ input from the sound signal processing unit 1011, for example, using the GHDSS method to separate the vector into sound signals of one or more sound sources and outputs the separated full reverberant signal $s(\omega)$ to the reduction unit 102. The sound source separation processing unit 1013 performs the process of step S104 after step S103 ends.

(Step S104) The sound source separation processing unit 1014 performs the sound source separating process on the vector $x^L(\omega)$ input from the sound signal processing unit 1012, for example, using the GHDSS method to separate the vector into sound signals of one or more sound sources and outputs the separated late reflection signal $s^L(\omega)$ to the reduction unit 102. The sound source separation processing unit 1014 performs the process of step S105 after step S104 ends. Steps S103 and S104 may be reversed in order or may be performed at the same time.

(Step S105) The vector parameter estimating unit 1021 estimates the feature vector $f^L$ of the late reflection signal $s^L(\omega)$ input from the sound source separation processing unit 1014 using Expression (12) and outputs the estimated feature vector $f^L$ to the direction estimating unit 1022. The vector parameter estimating unit 1021 performs the process of step S106 after step S105 ends.

(Step S106) The direction estimating unit 1022 estimates the direction of the speaker Sp based on the feature vector $f^L$ input from the vector parameter estimating unit 1021 and the likelihood of Expression (10). Then, the direction estimating unit 1022 estimates the equalizer characteristic $H_\theta$ using Expression (12) and outputs the estimated extension filter $H_\theta$ to the reverberation reducing filter calculating unit 1023. The direction estimating unit 1022 performs the process of step S107 after step S106 ends.

(Step S107) The reverberation reducing filter calculating unit 1023 corrects the late reflection signal $s^L(\omega)$ input from the sound source separation processing unit 1014 based on the equalizer characteristic corresponding to the estimated value $H_\theta\hat{}$ of the extension filter input from the direction estimating unit 1022. The reverberation reducing filter calculating unit 1023 outputs the corrected late reflection signal $s^L_\theta\hat{}(\omega)$ to the reverberation reducing unit 1024. The reverberation reducing filter calculating unit 1023 performs the process of step S108 after step S107 ends.

(Step S108) The reverberation reducing unit 1024 estimates the reverberation-reduced sound signal $e_\theta\hat{}(\omega)$ based on the full reverberant signal $s(\omega)$ input from the sound source separation processing unit 1013 and the corrected late reflection signal $s^L_\theta\hat{}(\omega)$ input from the reverberation reducing filter calculating unit 1023. The reverberation reducing unit 1024 outputs the reverberation-reduced sound signal $e_\theta\hat{}(\omega)$ to the speech recognizing unit 103. The reverberation reducing unit 1024 performs the process of step S109 after step S108 ends.

(Step S109) The speech recognizing unit 103 recognizes speech details (for example, a text indicating a word or a sentence) by performing a speech recognizing process on the reverberation-reduced sound signal $e_\theta\hat{}(\omega)$ input from the reduction unit 102, and outputs recognition data indicating the recognized speech details to the outside.

In this way, the speech processing ends.

Test Result

Figure 5:
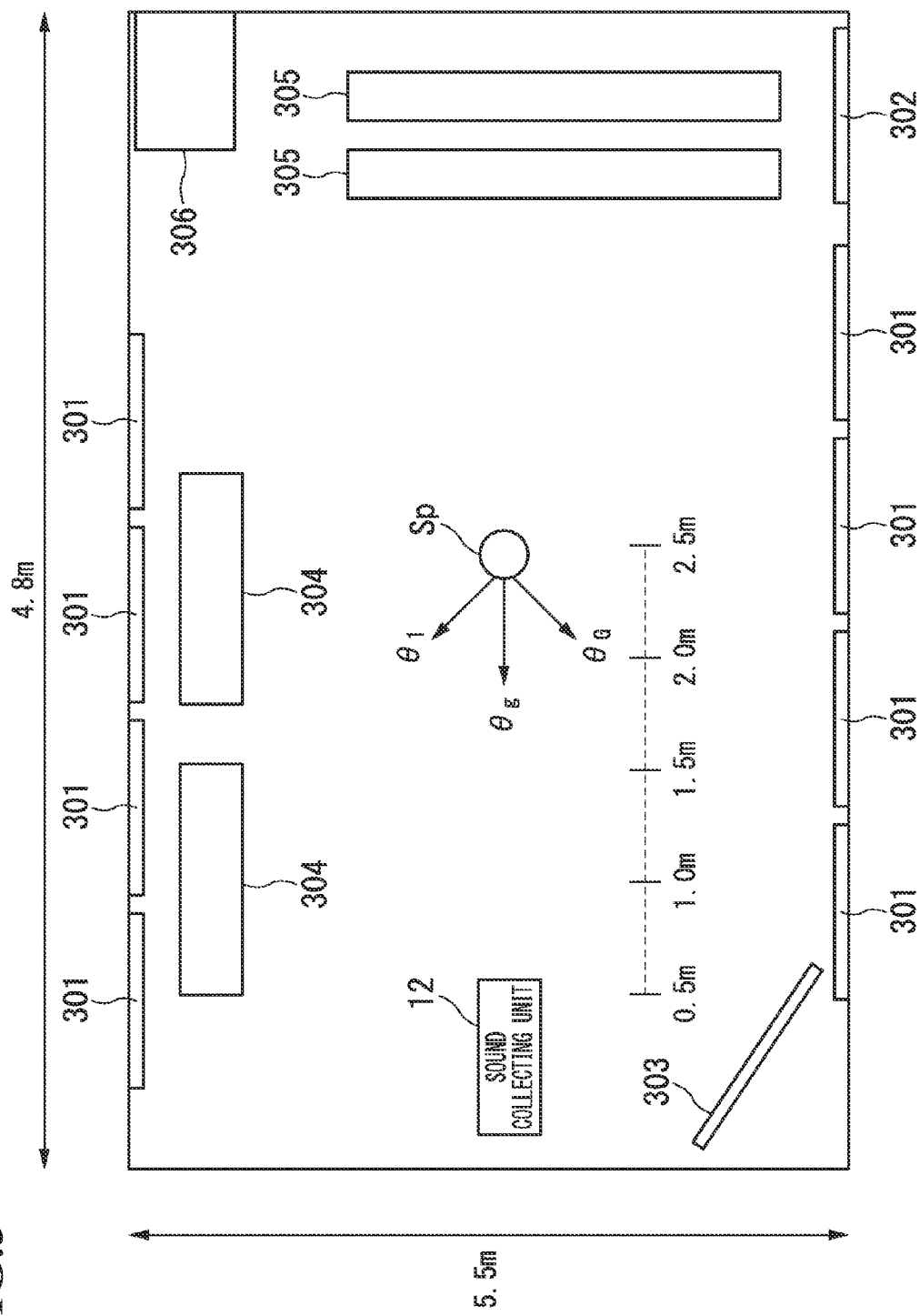
FIG. 5 is a diagram showing an environment in which a test is carried out in the first embodiment.

A test result in which the speech recognition accuracy was verified using the speech processing apparatus 11 according to this embodiment will be described below. The test was carried out in the environment shown in FIG. 5. FIG. 5 is a diagram showing the environment in which the test according to this embodiment was carried out. As shown in FIG. 5, the short-side length of a test room was 4.8 m and the long-side length thereof was 5.5 m. As shown in FIG. 5, the sound collecting unit 12 was arranged almost at the center in the long-side direction and at the left end in the short-side direction in the drawing. Glass windows 301 were arranged at both ends in the long-side direction of the test room. A door 302 was arranged on the right-lower side of the test room in the drawing. A whiteboard 303, a table 304, a sofa 305, and a refrigerator 306 were arranged in the test room. Test rooms having two different reverberation sounds were used for the test. Test room A had a reverberation time of 240 ms and test room B had a reverberation time of 640 ms. The direction of a speaker Sp was set to $\theta_1, \ldots, \theta_g, \ldots, \theta_G$. In the direction $\theta_g$, the speaker Sp was set to be perpendicular to the sound collecting unit 12.

First, the speech recognizing unit 103 was learned by causing 24 speakers to utter speeches 200 times using a Japanese newspaper article sentence (JNAS) corpus. A phonetically tied mixture (PTM) HMM including total 8256 normal distributions, which is a kind of continuous HMM, was used as acoustic models.

The test was carried out at distances of 0.5 m, 1.0 m, 1.5 m, 2.0 m, and 2.5 m which are distances between the sound collecting unit 12 and the speaker Sp and at directions of the speaker Sp of $\theta_1=30°$, $\theta_2=15°$, $\theta_3=0°$, $\theta_4=-15°$, and $\theta_5=-30°$ for each distance. Here, $\theta_3=0°$ indicates the direction of the speaker Sp perpendicular to the sound collecting unit 12. The test was carried out 200 times at each position. At each position, the test was carried out for the five angles. In the same test room, the room transfer functions for the positions and the directions were measured and stored in the storage unit 104.

Figure 6:
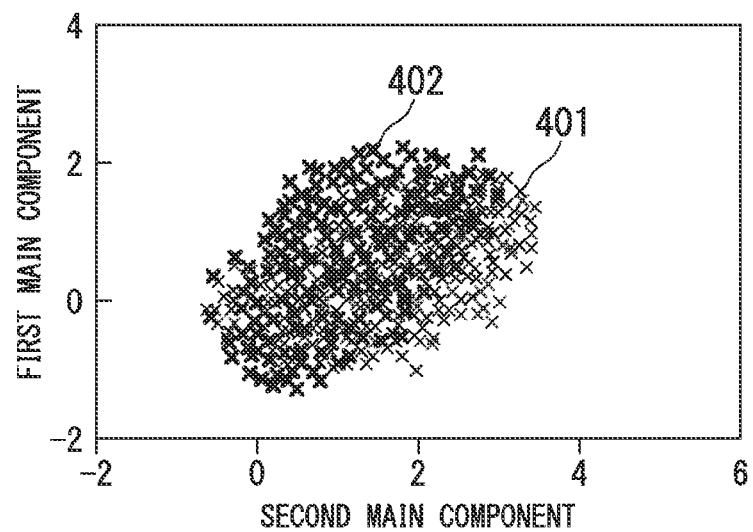
FIG. 6 is a diagram showing a main component analysis result of a first setting room.
Figure 7:
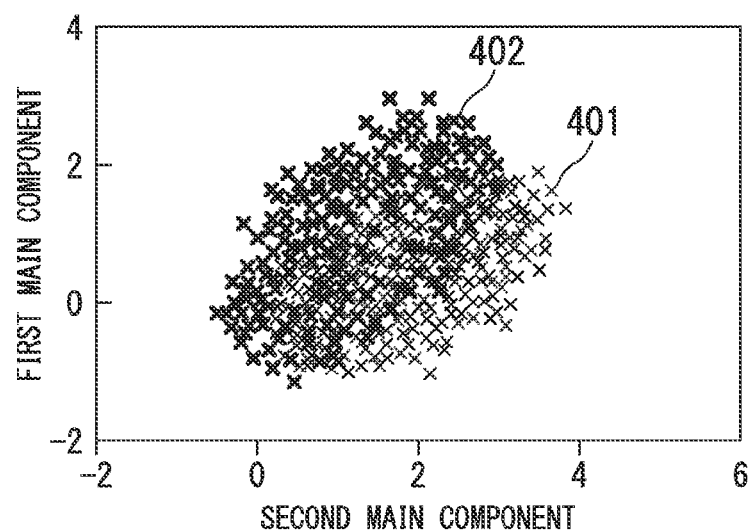
FIG. 7 is a diagram showing a main component analysis result of a second setting room.
Figure 8:
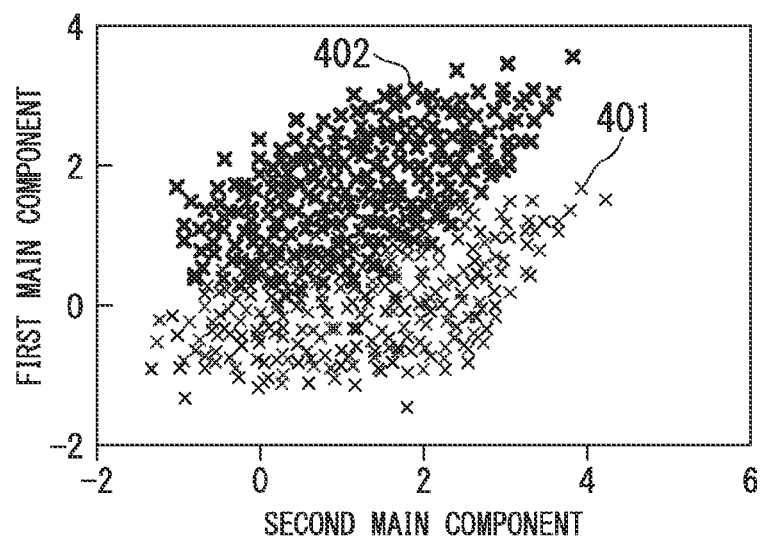
FIG. 8 is a diagram showing a main component analysis result of a third setting room.
Figure 9:
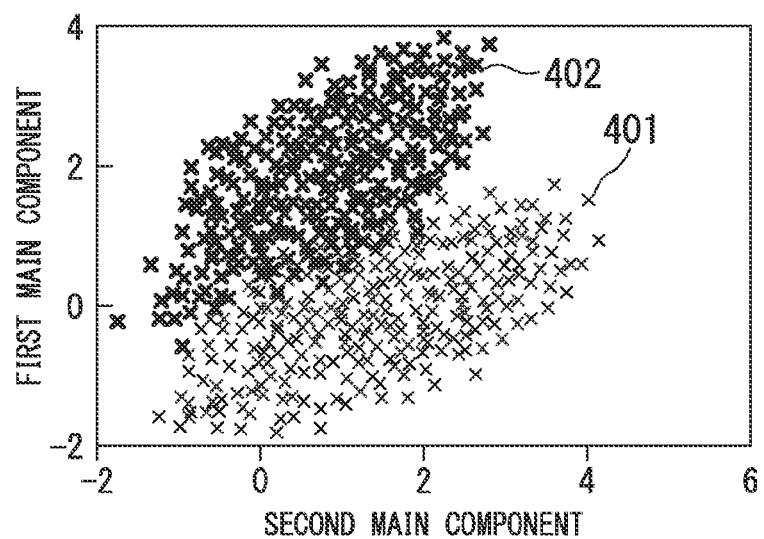
FIG. 9 is a diagram showing a main component analysis result of a fourth setting room.

First to fourth setting rooms will be described below with reference to FIGS. 6 to 9. FIGS. 6 to 9 are diagrams showing a main component analysis result of the vector estimation of late reflection when the direction θ of a speaker Sp are 30° and −30°. FIG. 6 is a diagram showing the main component analysis result of the first setting room. FIG. 7 is a diagram showing the main component analysis result of the second setting room. FIG. 8 is a diagram showing the main component analysis result of the third setting room. FIG. 9 is a diagram showing the main component analysis result of the fourth setting room. In FIGS. 6 to 9, the horizontal axis represents a second main component and the vertical axis represents a first main component. In FIGS. 6 to 9, an image indicated by reference numeral 401 represents the main component analysis result when the direction θ of a speaker Sp is −30° and an image indicated by reference numeral 402 represents the main component analysis result when the direction θ of a speaker Sp is 30°.

The room states of the first to fourth setting rooms shown in FIGS. 6 to 9 were determined to simulate sealability and symmetry of the rooms. The first setting room shown in FIG. 6 is most contrasting and the fourth setting room shown in FIG. 9 is most asymmetric. The second setting room shown in FIG. 7 is slightly contrasting and the third setting room shown in FIG. 8 is slightly asymmetric.

As shown in FIG. 6, in the first setting room, the main component analysis results when the direction θ of a speaker Sp was −30° and 30° were almost equal to each other. In the second setting room of FIG. 7, the main component analysis results when the direction θ of a speaker Sp was −30° and 30° were more dispersed than those of FIG. 6. In the third setting room of FIG. 8, the main component analysis results when the direction θ of a speaker Sp was −30° and 30° were more dispersed than those of FIG. 7. In the fourth setting room of FIG. 9, the main component analysis results when the direction θ of a speaker Sp was −30° and 30° were most dispersed.

The effectiveness of estimation of the direction of a speaker Sp will be described below with reference to FIG. 10. FIG. 10 is a diagram showing the effectiveness of estimation of the direction of a speaker Sp.

Appropriate selection of the direction $\hat{\theta}$ of a speaker Sp is effective for selecting the estimated value $\hat{H_\theta}$ of the extension filter which is the optimal equalization parameter. First, in the first to fourth setting rooms, three different random positions (first to third positions) are selected. The values of columns shown in FIG. 10 denote the accuracy of the estimated value of the direction of a speaker Sp. As shown in the first row of FIG. 10, in the first setting room having the best symmetry, the accuracy of the estimated value of the direction of a speaker Sp was 100% at each of the first to third positions. As shown in the second row, in the second setting room, the accuracy of the estimated value of the direction of a speaker Sp ranged from 98% to 99%. As shown in the third row, in the third setting room, the accuracy of the estimated value of the direction of a speaker Sp ranged from 94% to 95%. As shown in the fourth row, in the fourth setting room, the accuracy of the estimated value of the direction of a speaker Sp ranged from 88% to 90%. That is, the first setting room exhibiting the best symmetry had the best performance, and the fourth setting room having asymmetry exhibited the poorest performance.

Figure 11:
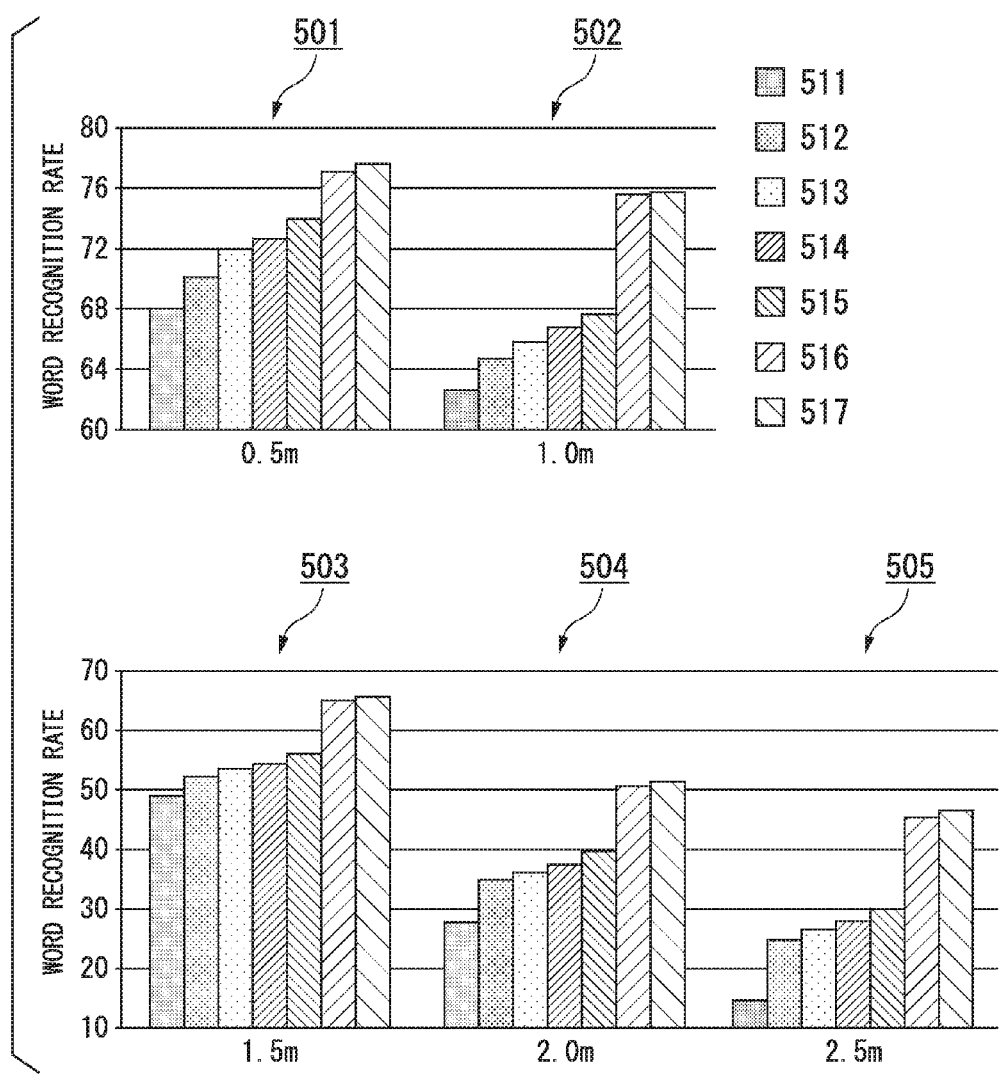
FIG. 11 is a diagram showing a result when a speech recognition process is performed in test room A using the speech processing apparatus according to the first embodiment.
Figure 12:
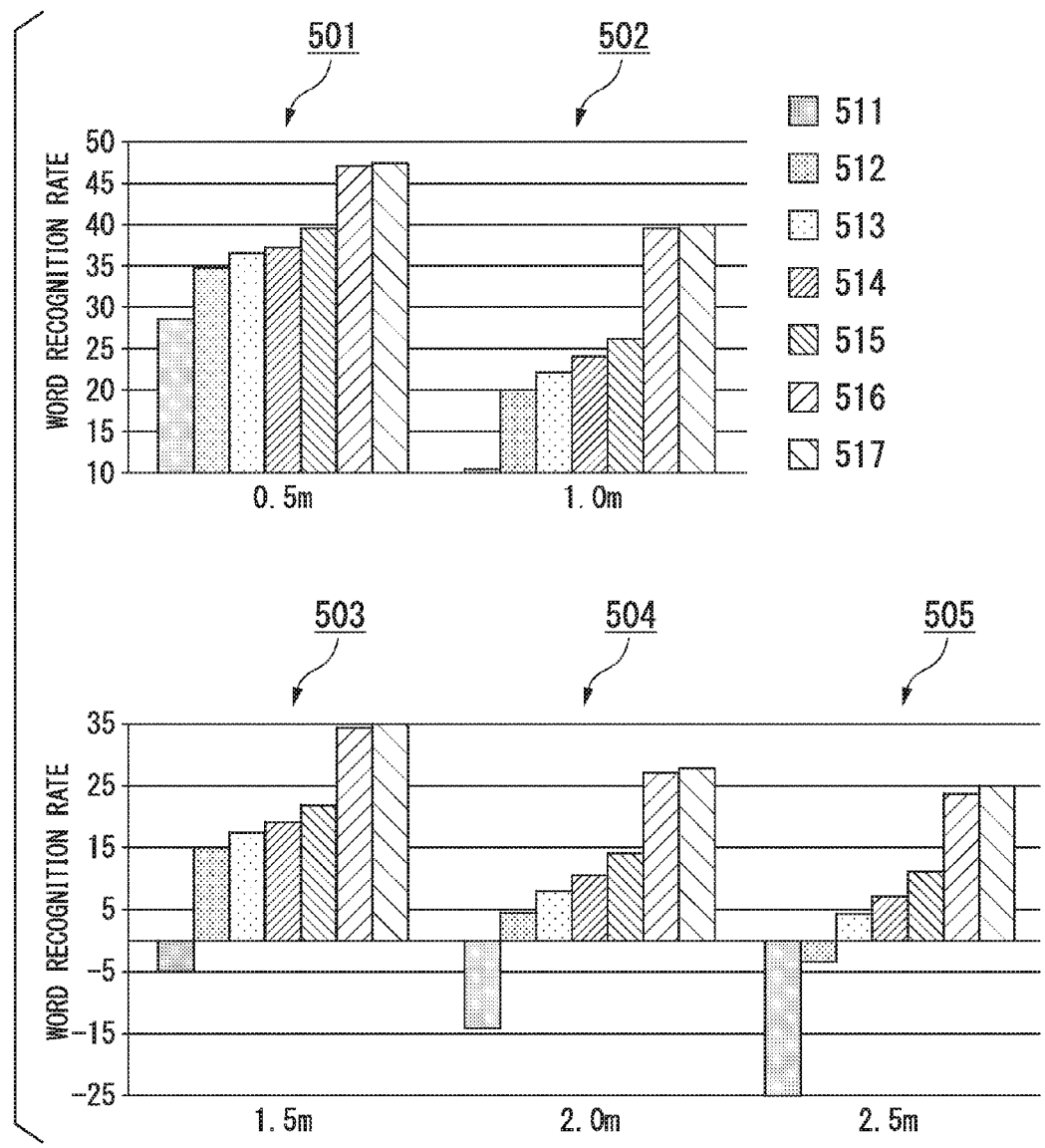
FIG. 12 is a diagram showing a result when a speech recognition process is performed in test room B using the speech processing apparatus according to the first embodiment.

The results when the speech recognizing process is carried out using the speech processing apparatus 11 according to this embodiment in test room A and test room B will be described. FIG. 11 is a diagram showing the result when the speech recognition process is performed in test room A using the speech processing apparatus 11 according to this embodiment. FIG. 12 is a diagram showing the result when the speech recognition process is performed in test room B using the speech processing apparatus 11 according to this embodiment. In FIGS. 11 and 12, the vertical axis represents a word recognition rate.

In FIGS. 11 and 12, images in a zone denoted by reference numeral 501 indicate the resultant images when a speaker Sp was located at a position of 0.5 m spaced from the sound collecting unit 12. Images in a zone denoted by reference numeral 502 indicate the resultant images when a speaker Sp was located at a position of 1.0 m spaced from the sound collecting unit 12. Images in a zone denoted by reference numeral 503 indicate the resultant images when a speaker Sp was located at a position of 1.5 m spaced from the sound collecting unit 12. Images in a zone denoted by reference numeral 504 indicate the resultant images when a speaker Sp was located at a position of 2.0 m spaced from the sound collecting unit 12. Images in a zone denoted by reference numeral 505 indicate the resultant images when a speaker Sp was located at a position of 2.5 m spaced from the sound collecting unit 12.

In FIGS. 11 and 12, the image denoted by reference numeral 511 is an image indicating the speech recognition result for a reverberation signal of one channel without reverberation (this method is referred to as method A). The image denoted by reference numeral 512 is an image indicating the speech recognition result for reverberation signals separated from multiple channels without reverberation (this method is referred to as method B). The image denoted by reference numeral 513 is an image indicating the speech recognition result for a wavelet-based reverberation signal described in Non-Patent Document 3 (this method is referred to as method C). The image denoted by reference numeral 514 is an image indicating the speech recognition result for a blind dereverberation-based reverberation signal described in Non-Patent Document 4 (this method is referred to as method D). The image denoted by reference numeral 515 is an image indicating the speech recognition result when a plurality of room transfer functions RTF are applied (this method is referred to as method E). The image denoted by reference numeral 516 is an image indicating the speech recognition result using the speech processing apparatus 11 according to this embodiment (this method is referred to as method F). The image denoted by reference numeral 517 is an image indicating the speech recognition result when a plurality of room transfer functions RTF are applied using the speech processing apparatus 11 according to this embodiment (this method is referred to as method G).

Non-Patent Document 3: S. Griebel and M. Brandstein, "Wavelet Transform Extrema Clustering for Multi-channel Speech Dereverberation"

Non-Patent Document 4: B. Yegnanarayana and P. Satyaranyarana, "Enhancement of Reverberant Speech Using LP Residual Signals", In Proceedings of IEEE Trans. on Audio, Speech and Lang. Proc., 2000.

As shown in FIG. 11, in test room A with a reverberation time of 240 ms, the word recognition rate was the lowest in method A and was the highest in method G. Method F which is the method according to this embodiment was equal in word recognition rate to method G.

For example, when the distance to the speaker Sp was 0.5 m, the word recognition rate was about 68% in method A, about 70% in method B, about 72% in method C, and about 72.5% in method D. The word recognition rate was about 74% in method E, about 77.5% in method F, and about 78% in method G.

For example, when the distance to the speaker Sp was 2.5 m, the word recognition rate was about 15% in method A, about 25% in method B, about 27% in method C, and about 28% in method D. The word recognition rate was about 30% in method E, about 46% in method F, and about 47% in method G.

As shown in FIG. 12, in test room B with a reverberation time of 640 ms, the word recognition rate was the lowest in method A and was the highest in method G. Method F which is the method according to this embodiment was equal in word recognition rate to method G.

For example, when the distance to the speaker Sp was 1.0 m, the word recognition rate was about 11% in method A, about 20% in method B, about 22% in method C, and about 24% in method D. The word recognition rate was about 26% in method E, about 39% in method F, and about 40% in method G.

For example, when the distance to the speaker Sp was 2.0 m, the word recognition rate was about −14% in method A, about 7% in method B, about 10% in method C, and about 12% in method D. The word recognition rate was about 14% in method E, about 26% in method F, and about 27% in method G.

Figure 13:
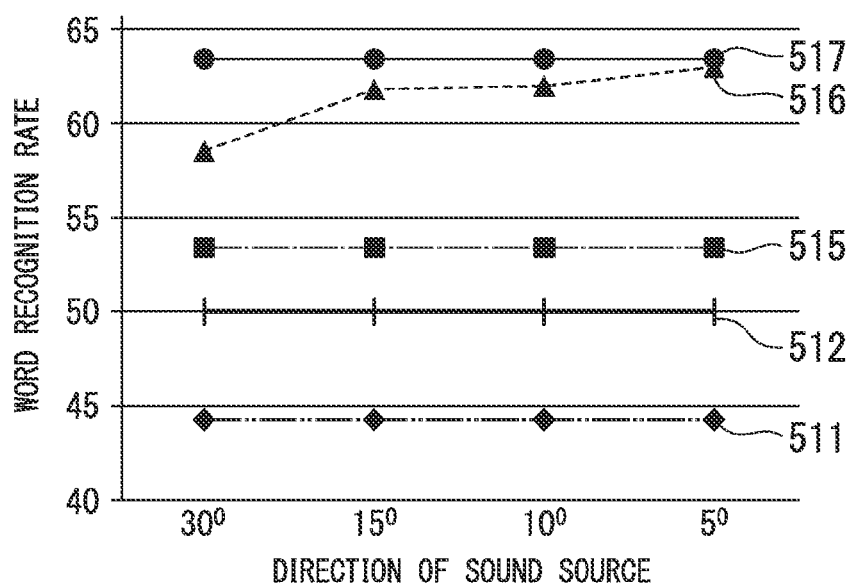
FIG. 13 is a diagram showing word recognition rates based on methods A, B, E, F, and G shown in FIGS. 11 and 12 in test room A.
Figure 14:
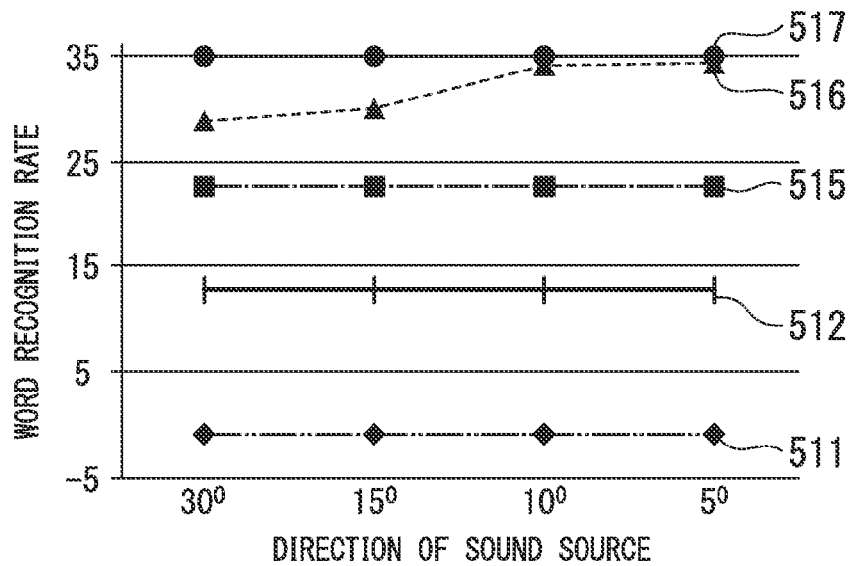
FIG. 14 is a diagram showing word recognition rates based on methods A, B, E, F, and G shown in FIGS. 11 and 12 in test room B.

An example of the word recognition rate depending on the direction θ of a speaker Sp will be described below with reference to FIGS. 13 and 14. FIG. 13 is a diagram showing word recognition rates in methods A, B, E, F, and G shown in FIGS. 11 and 12 in test room A. FIG. 14 is a diagram showing word recognition rates in methods A, B, E, F, and G shown in FIGS. 11 and 12 in test room B. In FIGS. 13 and 14, the horizontal axis represents the direction θ of a speaker Sp and the vertical axis represents the word recognition rate. In FIGS. 13 and 14, images denoted by reference numerals 511, 512, 515, 516, and 517 indicate the word recognition rates in methods A, B, E, F, and G.

First, the test result in test room A with a reverberation time of 240 ms will be described.

As shown in FIG. 13, the word recognition rate was about 44% regardless of the direction of a speaker Sp in method A (reference numeral 511), about 50% regardless of the direction of a speaker Sp in method B (reference numeral 512), and about 53% regardless of the direction of a speaker Sp in method E (reference numeral 515). On the other hand, in method F (reference numeral 516) which is the method according to this embodiment, the word recognition rate varied depending on the direction of a speaker Sp and the word recognition rate ranged from about 58% to 63%. That is, in method F, the word recognition rate became higher as it became closer to the direction 0° of a speaker which was the front side of the sound collecting unit 12, and the word recognition rate became lower as it became farther from 0°. In method G (reference numeral 517), the word recognition rate was about 63% regardless of the direction of a speaker Sp. In this way, the speech processing apparatus 11 according to this embodiment had a significant difference in word recognition rate from other methods in test room A with a short reverberation time.

The test result of test room B with a reverberation time of 640 ms will be described below.

As shown in FIG. 14, the word recognition rate was about −1% regardless of the direction of a speaker Sp in method A (reference numeral 511), about 12% regardless of the direction of a speaker Sp in method B (reference numeral 512), and about 22% regardless of the direction of a speaker Sp in method E (reference numeral 515). On the other hand, in method F (reference numeral 516) which is the method according to this embodiment, the word recognition rate varied depending on the direction of a speaker Sp and the word recognition rate ranged from about 27% to 35%. That is, in method F, the word recognition rate became higher as it became closer to the direction 0° of a speaker which was the front side of the sound collecting unit 12, and the word recognition rate became lower as it became farther from 0°. In method G (reference numeral 517), the word recognition rate was about 35% regardless of the direction of a speaker Sp. In this way, the speech processing apparatus 11 according to this embodiment had a significant difference in word recognition rate from other methods in test room B with a long reverberation time.

As described above, the speech processing apparatus 11 according to this embodiment includes the sound collecting unit 12 configured to collect sound signals, the sound source direction estimating unit (the direction estimating unit 1022) configured to estimate the direction of a sound source of each sound signal collected by the sound collecting unit 12, the reverberation reducing filter calculating unit 1023 configured to calculate a reverberation reducing filter to be applied to the sound signals collected by the sound collecting unit 12, and the reduction processing unit (the reverberation reducing unit 1024) configured to apply the reverberation reducing filter calculated by the reverberation reducing filter calculating unit 1023 to the sound signals, the reverberation reducing filter calculating unit 1023 calculates the reverberation reducing filter to be applied based on the directions of the sound sources estimated by the sound source direction estimating unit (the direction estimating unit 1022).

According to this configuration, the speech processing apparatus 11 according to this embodiment can reduce reverberations by applying the reverberation reducing filter calculated depending on the directions of the sound sources emitting the sound signals to the sound signals. Accordingly, it is possible to achieve the reverberation reduction to improve speech recognition accuracy even when the direction of a sound source is changed.

For example, in apparatuses according to the related art, in order to secure the robustness of a system to a variation in the direction of a sound source, it is necessary to collect and calculate the room transfer functions corresponding to all directions of the sound source using microphones. On the other hand, in the speech processing apparatus 11 according to this embodiment, it is possible to secure the robustness of a system to the variation in the direction of a sound source using a simple equalizer process without processing the sound signals of multiple channels. In the speech processing apparatus 11 according to this embodiment, it is not necessary to process the sound signals of multiple channels, unlike the related art, and it is thus possible to reduce the computational load.

Second Embodiment

The first embodiment has described an example where the reduction unit 102 performs estimation of the direction of a speaker Sp and reduction of reverberations using the full reverberant signal $s(\omega)$ and the late reflection signal (late reflection component) $s^L(\omega)$ into which the collected sound signals of N channels are separated by the sound source separating unit 101.

The estimation of the direction of a speaker Sp or the reduction of reverberations may be performed by only the reduction unit 102.

Figure 15:
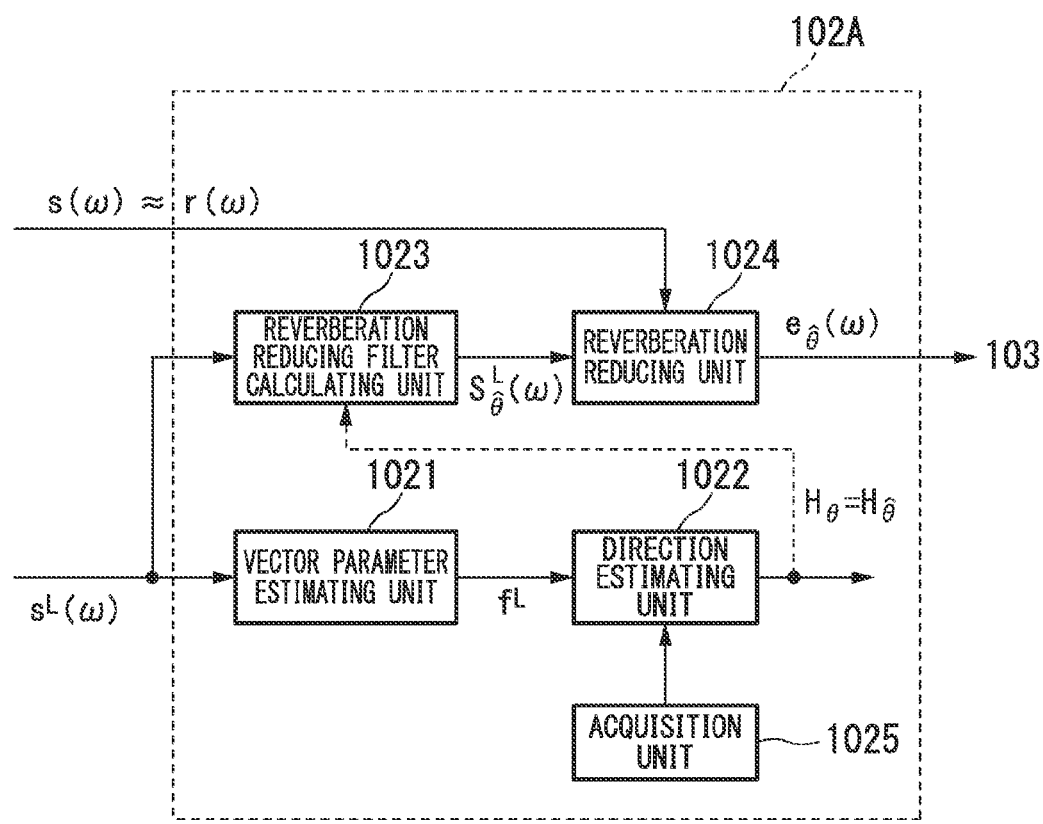
FIG. 15 is a block diagram showing the configuration of a reduction unit according to a second embodiment of the invention.

FIG. 15 is a block diagram showing a configuration of a reduction unit 102A according to this embodiment. As shown in FIG. 15, the reduction unit 102A includes a vector parameter estimating unit 1021, a direction estimating unit (the sound source direction estimating unit) 1022, a reverberation reducing filter calculating unit 1023, a reverberation reducing unit (the reduction processing unit) 1024, and an acquisition unit 1025.

For example, a full reverberant signal $s(\omega)$ and a late reflection signal $s^L(\omega)$ collected in advance may be directly input to the reduction unit 102A.

Alternatively, a full reverberant signal $s(\omega)$ and a late reflection signal (late reflection component) $s^L(\omega)$ into which a sound signal collected by one microphone of the microphones of the sound collecting unit 12 is separated by the sound source separating unit 101 may be input to the reduction unit 102A.

The acquisition unit 1025 of the reduction unit 102A may acquire an image captured by an imaging device and may output the acquired image to the direction estimating unit 1022. The direction estimating unit 1022 may estimate the direction of a speaker Sp (sound source) based on the captured image.

The acquisition unit 1025 may acquire a detected value output from an azimuth sensor or the like mounted on the head of a speaker Sp and may output the acquired detected value to the direction estimating unit 1022. The direction estimating unit 1022 may estimate the direction of the speaker Sp (sound source) based on the acquired detected value.

Alternatively, the reduction unit 102A may be connected to the respective microphones of the sound collecting unit 12.

This embodiment has described an example where a word uttered by a speaker Sp is recognized, but the invention is not limited to this example. The sound signals collected by the sound collecting unit 12 are not limited to speeches but may be music.

In this case, the speech processing apparatus 11 may estimate, for example, a tempo of a piece of music by performing a beat tracking process (not shown) and estimating a direction of a sound source.

Examples of equipment into which the speech processing apparatus 11 is assembled include a robot, a vehicle, and a mobile terminal. In this case, the robot, the vehicle, or the mobile terminal may include the sound collecting unit 12.

The sound source direction may be estimated by recording a program for performing the functions of the sound processing apparatus 11 according to the invention on a computer-readable recording medium and reading and executing the program recorded on the recording medium into a computer system. Here, the "computer system" may include an OS or hardware such as peripherals. The "computer system" may include a WWW system including a homepage providing environment (or display environment). Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that temporarily holds a program for a predetermined time, like a volatile memory (RAM) in a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize a part of the above-mentioned functions or may be configured to realize the above-mentioned functions by combination with a program recorded in advance in a computer system, like a so-called differential file (differential program).

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A speech processing apparatus, comprising:
   a sound collecting unit that collects sound signals;
   a sound source direction estimating unit that estimates a direction of a sound source of each sound signal collected by the sound collecting unit and selects an extension filter which is to be applied to the each sound signal and corresponds to the estimated sound source of the each sound signal;

a reverberation reducing filter calculating unit that corrects the each sound signal using the extension filter; and a reduction processing unit that performs a reverberation reduction using the sound signals corrected by the reverberation reducing filter calculating unit and the sound signals collected by the sound collecting unit.

2. The speech processing apparatus according to claim 1, wherein the sound source direction estimating unit estimates the directions of the sound sources based on at least one of an image captured by an imaging unit and detection results of azimuth sensors attached to the vicinities of the sound sources.

3. The speech processing apparatus according to claim 1, wherein the sound source direction estimating unit estimates the direction of the sound source using a feature vector of the single sound signal collected by the sound collecting unit and a probability model of the direction of each of the sound sources.

4. The speech processing apparatus according to claim 1, further comprising a sound source separating unit that separates a full reverberant signal and a late reflection signal from the sound signals collected by the sound collecting unit, wherein the sound source direction estimating unit estimates the direction of the sound source of the each sound signal collected by the sound collecting unit using the late reflection signal separated by the sound source separating unit, wherein the reverberation reducing filter calculating unit corrects the late reflection signal using the extension filter, and wherein the reduction processing unit performs a reverberation reduction of the full reverberant signal by dividing a power of the full reverberant signal by a power of the late reflection signal corrected by the reverberation reducing filter calculating unit.

5. The speech processing apparatus according to claim 4, wherein the reduction processing unit performs the reverberation reduction by reducing the late reflection signal from the full reverberant signal separated by the sound source separating unit using the full reverberant signal, the late reflection signal corrected by the reverberation reducing filter calculating unit and the extension filter.

6. The speech processing apparatus according to claim 4, further comprising:

a first sound signal processing unit that calculates a first feature vector of the sound signals collected by the sound collecting unit based on a first room transfer function; and a second sound signal processing unit that calculates a second feature vector of the sound signals collected by the sound collecting unit based on a second room transfer function, wherein the sound source separating unit includes a first sound source separating unit that separates the full reverberant signal based on the first feature vector calculated by the first sound signal processing unit, and a second sound source separating unit that separates the late reflection signal based on the second feature vector calculated by the second sound signal processing unit, and wherein the reduction processing unit performs the reverberation reduction by reducing the late reflection signal separated by the second sound source separating unit from the full reverberant signal separated by the first sound source separating unit using the full reverberant signal, the late reflection signal corrected by the reverberation reducing filter calculating unit and the extension filter.

7. A non-transitory computer-readable recording medium having recorded thereon a speech processing program causing a computer of a speech processing apparatus to:

collect sound signals;

estimate a direction of a sound source of each sound signal collected in the sound collecting procedure;

select an extension filter which is to be applied to the each sound signal and corresponds to the estimated sound source of the each sound signal;

correct the each sound signal using the extension filter; and perform a reverberation reduction using the corrected sound signals and the collected sound signals.

8. A speech processing method, comprising:

a sound collecting step of collecting sound signals;

a sound source direction estimating step of estimating a direction of a sound source of each sound signal collected in the sound collecting step and selecting an extension filter which is to be applied to the each sound signal and corresponds to the estimated sound source of the each sound signal;

a reverberation reducing filter calculating step of correcting the each sound signal using the extension filter; and a reduction step of performing a reverberation reduction using the corrected sound signals and the collected sound signals.

\* \* \* \* \*